3,127,430
17α-METHYL-1,5-ANDROSTADIENES-17β-OL-3-ONE AND DERIVATIVES THEREOF
Elliot L. Shapiro, Cedar Grove, and Eugene P. Oliveto, Glen Ridge, N.J., assignors to Schering Corporation, Bloomfield, N.J., a corporation of New Jersey
No Drawing. Filed Jan. 16, 1963, Ser. No. 251,747
6 Claims. (Cl. 260—397.4)

This invention relates to novel steroids. More particularly, this invention relates to 17α-methyl-1,5-androstadiene-17β-ol-3-one and derivatives thereof, which are valuable therapeutically and as intermediates in the preparation of other therapeutically valuable steroids.

Among the compounds of this invention are 1,5-androstadienes of the following general formula:

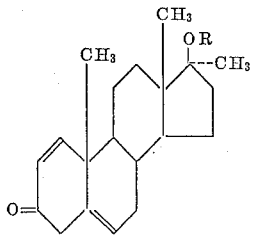

wherein R is a member selected from the group consisting of H and an acid radical of a carboxylic acid having up to 12 carbon atoms.

Illustrative of the carboxylic acid esters contemplated at C–17 are lower alkanoates such as acetate, propionate, caproate, tertiary butylacetate, cyclopentylpropionate, dimethylacetate, trimethylacetate, and phenoxyacetate; aryl esters such as benzoate, nicotinate, thiophene carboxylate; and esters from dibasic organic acids such as succinate, phthalate, and sulfobenzoate.

Included among the 1,5-androstadienes of this invention are 17α-methyl-1,5-androstadiene-17β-ol-3-one and the 17-acetate, 17-caproate, 17-benzoate, 17-decanoate, and 17-succinate esters thereof.

The 3-keto-17α-methyl-1,5-androstadienes of this invention are preferably prepared from the corresponding 1,4-androstadienes by treatment with a strong basic agent such as sodium acetylide or sodium hydride in a solvent which does not give up a proton such as dimethylsulfoxide or tetrahydrofuran utilizing techniques such as are described in the copending application of Tanabe and Shapiro, Serial No. 251,744, filed on even date with the instant application. The ester derivatives of 17α-methyl-1,5-androstadiene-17β-ol-3-one are also preferably prepared from the corresponding 1,4-androstadiene 17-esters by treatment with a strong base as described above.

Thus, for example, 17α-methyl-1,4-androstadiene-17β-ol-3-one and the 17-acetate thereof upon reaction with sodium acetylide in dimethylsulfoxide or dimethylformamide at room temperature, followed by isolation utilizing solvent extraction or chromatographic techniques known in the art, yields the novel steroids respectively, 17α-methyl-1,5-androstadiene-17β-ol-3-one and 17α-methyl-1,5-androstadiene-17β-ol-3-one 17-acetate.

The starting ester derivatives of 17α-methyl-1,4-androstadiene-17-ol-3-one are prepared via techniques known in the art, such as those utilizing an acid anhydride or an acid halide in pyridine. Thus, for example, a 17β-lower alkanoate of 17α-methyl-1,4-androstadiene-17β-ol-3-one is prepared by warming the steroid on a steam bath in admixture with a pyridine solution of a lower alkanoic acid anhydride, e.g., acetic anhydride, whereby there is obtained the corresponding 17β-acetate ester, 17α-methyl-1,4-androstadiene-17β-ol-3-one acetate. Similarly, reaction of 17α-methyl-1,4-androstadiene-17β-ol-3-one with succinic acid anhydride in pyridine, or with benzoyl chloride in pyridine in known manner, yields 17α-methyl-1,4-androstadiene-17β-ol-3-one, 17-hemisuccinate and 17-benzoate respectively.

17α-methyl-1,5-androstadiene-17β-ol-3-one and esters thereof are valuable therapeutically in that they possess a high anabolic/androgenic activity ratio, i.e., they are potent anabolic agents having a minimum of androgenic activity. They are thus valuable in promoting weight gain for those in debilitated states, for the relief of pain in the treatment of osteoporosis and arthritis, and in promoting tissue repair and increasing vitality to those convalescing or in geriatric states.

Advantageously and surprisingly it has been found that 17α-methyl - 1,5 - androstadiene-17β-ol-3-one possesses a greatly enhanced and favorable anabolic/androgenic activity ratio over that of the 17-desmethyl analog, i.e., 1,5-androstadiene-17β-ol-3-one as determined by studies made in immature castrated rats via the test of Hershberger et al., Proc. Soc. Exper. Biol. and Med. 83, 175 (1953), adapted for oral administration of the drug.

Our compounds are preferably administered orally in daily doses ranging from about 1–20 mgm. depending on the nature and severity of the patient's illness. Convenient composition forms for oral use are tablets of unit doses of 1 mgm. and 5 mgm. which are prepared utilizing procedures known in the art. In formulating these pharmaceutical compositions a novel compound of this invention, e.g., 17α-methyl-1,5-androstadiene-17β-ol-3-one, is usually compounded with an excipient which is edible and chemically inert to the aforenamed 1,5-androstadiene. Excipients such as lactose, sucrose, starch, pre-gelatinized starch, gum arabic, gum tragacanth or mixtures thereof may be used, usually in admixture with an additive such as magnesium stearate, talc, cornstarch or the like.

Oral pharmaceutical composition forms other than tablets may be used. Thus, in general, fine powders or granules of 17α-methyl-1,5-androstadiene-17β-ol-3-one or an ester thereof may contain diluents and dispersing and surface active agents and may be presented in a syrup, or in capsules or cachets in the dry state or in a non-aqueous suspension, when a suspending agent may be included in tablets, when binders and lubricants may be included; or in a suspension in water or in a syrup or in an oil, or in a water/oil emulsion when flavoring, preserving, thickening, emulsifying agents may be included. The granules or the tablets may be coated.

In addition to being therapeutically active per se, 17α-methyl-1,5-androstadiene-17β-ol-3-one and esters thereof are valuable as intermediates in preparing the corresponding 3β-hydroxy steroids which are also therapeutically valuable as anabolic/androgenic agents. Thus, 17α-methyl-1,5-androstadiene-17β-ol-3-one in methanol when reacted with sodium borohydride in water at temperatures below 18° C., yields 17α-methyl-1,5-androstadiene-3β,17β-diol possessing anabolic activity, described and claimed in the about-to-be filed application of Tanable and Oliveto.

The following examples are illustrative of methods of manufacture of compounds of our invention and not as indicating the scope of our invention, the scope being defined only by the appended claims.

EXAMPLE 1

*17α-Methyl-1,5-Androstadiene-17β-Ol-3-One*

Add 44 ml. of a suspension of 20% sodium acetylide in xylene to 100 ml. of dimethylsulfoxide in which is dissolved 5 g. of 17α-methyl-1,4-androstadiene-17β-ol-3-one and stir the reaction mixture at room temperature for approximately 30 minutes, then pour the mixture slowly into 1.5 l. of ice water. Add sodium chloride to this mixture until the aqueous phase is saturated, then extract with methylene chloride. Combine the methylene chloride extracts, wash with water, then dry over magnesium sulfate and evaporate in vacuo on a steam bath to a crystalline residue of about 5 g. of 17α-methyl-1,5-androstadiene-17β-ol-3-one. Purify be recrystallizing from acetone-hexane. Yield of purified 17α-methyl-1,5-androstadiene-17β-ol-3-one=3.75 g. (75%). M.P. 194–198° C., [α]$_D$ +43.9 (dioxane), $\lambda_{max.}^{methanol}$ 226 (E 11,250)

EXAMPLE 2

*17α-Methyl-1,5-Androstadiene-17β-Ol-3-One 17-Acetate*

A. 17α-METHYL-1,4-ANDROSTADIENE-17β-OL-3-ONE 17-ACETATE

Add 1 g. of 17α-methyl-1,4-androstadiene-17β-ol-3-one to a solution of 1 ml. pyridine and 1.0 ml. acetic anhydride and heat the reaction solution on the steam bath for about 15 hours. Add the reaction mixture to cold, dilute, aqueous hydrochloric acid and collect the resulting precipitate by filtration to give 17α-methyl-1,4-androstadiene-17β-ol-3-one 17-acetate. Purify by crystallization from acetone-hexane.

B. 17α-METHYL-1,5-ANDROSTADIENE-17β-OL-3-ONE 17-ACETATE

In a manner similar to that described in Example 1 (except that dimethylformamide is used in place of dimethylsulfoxide, and the reaction time is 15 minutes instead of 30) allow a solution of 17α-methyl-1,4-androstadiene-17β-ol-3-one 17-acetate in 100 ml. dimethylformamide to react with sodium acetylide in xylene. Isolate the resultant product as described and purify by chromatography over silica gel moistened with methylene chloride. Elute with hexane, then hexane with increasing quantities of ether. Combine like early fractions, and crystallize from acetone-hexane to give 17α-methyl-1,5-androstadiene-17β-ol-3-one 17-acetate, M.P. 163–166° C.

In a similar manner, by substituting succinic anhydride or other lower alkanoic acid anhydrides such as valeric, caproic, or decanoic anhydride for acetic anhydride in the above procedure, there is obtained the corresponding 17-succinate, 17-valerate, 17-caproate, or 17-decanoate respectively, of 17α-methyl-1,4-androstadiene-17β-ol-3-one, each of which upon treatment with sodium acetylide in the manner of Example 2B yields the 17-succinate, the 17-valerate, 17-caproate, and the 17-decanoate respectively of 17α-methyl-1,5-androstadiene-17β-ol-3-one.

We claim:

1. A compound of the following formula:

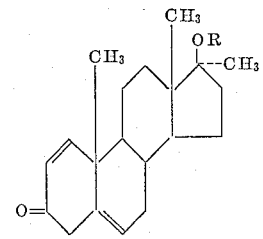

wherein R is a member selected from the group consisting of H and an acid radical of a carboxylic acid having up to 12 carbon atoms.

2. 17α-methyl-1,5-androstadiene-17β-ol-3-one.

3. 17α-methyl-1,5-androstadiene-17β-ol-3-one 17-lower alkanoate.

4. 17α-methyl-1,5-androstadiene-17β-ol-3-one 17-acetate.

5. 17α-methyl-1,5-androstadiene - 17β - ol-3-one 17-benzoate.

6. 17α-methyl-1,5-androstadiene - 17β - ol-3-one 17-succinate.

No references cited.